US010023935B2

(12) United States Patent
Chaiko et al.

(10) Patent No.: US 10,023,935 B2
(45) Date of Patent: Jul. 17, 2018

(54) SYSTEM AND METHOD FOR ENHANCED METAL RECOVERY DURING ATMOSPHERIC LEACHING OF METAL SULFIDES

(71) Applicant: FLSmidth A/S, Valby (DK)

(72) Inventors: David J. Chaiko, South Jordan, UT (US); Frank Baczek, Salt Lake City, UT (US); Tom Walters, Medford, OR (US); Sarah (Sally) Rocks, Sandy, UT (US); Carlos Eyzaguirre, Draper, UT (US)

(73) Assignee: FLSmidth A/S (DK)

(*) Notice: Subject to any disclaimer, the term of this patent is extended or adjusted under 35 U.S.C. 154(b) by 0 days.

(21) Appl. No.: 15/509,147

(22) PCT Filed: Sep. 14, 2015

(86) PCT No.: PCT/US2015/050045
§ 371 (c)(1),
(2) Date: Mar. 6, 2017

(87) PCT Pub. No.: WO2016/040955
PCT Pub. Date: Mar. 17, 2016

(65) Prior Publication Data
US 2017/0283908 A1    Oct. 5, 2017

Related U.S. Application Data

(60) Provisional application No. 62/050,039, filed on Sep. 12, 2014.

(51) Int. Cl.
C22B 1/00    (2006.01)
C22B 3/04    (2006.01)
(Continued)

(52) U.S. Cl.
CPC .............. C22B 15/001 (2013.01); C22B 1/00 (2013.01); C22B 3/02 (2013.01); C22B 3/04 (2013.01); C22B 15/0065 (2013.01)

(58) Field of Classification Search
CPC ........... C22B 3/04; C22B 1/00; C22B 15/001; C22B 15/0065
See application file for complete search history.

(56) References Cited

U.S. PATENT DOCUMENTS 3,616,331 A    10/1971  O'Neill et al.
4,115,221 A    9/1978   Wadsworth et al.
(Continued)

FOREIGN PATENT DOCUMENTS

CN    1249009 A      3/2000
WO    WO-2004106561 A1 *  9/2004
(Continued)

OTHER PUBLICATIONS

Cowper, Mark and Rickard, David. "Mechanism of Chalcopyrite Formation from Iron Monosulphides in Aqueous Solutions (< 100 C, pH 2-4.5)." Chemical Geology 78 pp. 325-341. (Year: 1989).*
(Continued)

*Primary Examiner* — George Wyszomierski
*Assistant Examiner* — Tima M McGuthry-Banks
(74) *Attorney, Agent, or Firm* — Jeffrey A. Sharp; Matthew R. Weaver; Daniel DeJoseph (57) ABSTRACT

A method of improving metal leach kinetics and recovery during atmospheric or substantially atmospheric leaching of a metal sulfide is disclosed. In some embodiments, the method may comprise the steps of: (a) producing a metal sulfide flotation concentrate; (b) processing the metal sulfide concentrate in a reductive activation circuit that operates at a first redox potential, to produce a reductively-activated metal sulfide concentrate; and, (c) subsequently processing
(Continued)

the activated metal sulfide concentrate in an oxidative leach circuit to extract metal values. In some disclosed embodiments, reductive activation steps may be employed prior to oxidative leaching steps (including heap leap leaching or bio-leaching steps). In some embodiments, physico-chemical processing steps may be employed during reductive activation and/or oxidative leaching. Systems for practicing the aforementioned methods are also disclosed.

19 Claims, 6 Drawing Sheets

(51) Int. Cl.
   *C22B 15/00* (2006.01)
   *C22B 3/02* (2006.01)

(56) References Cited

U.S. PATENT DOCUMENTS

| | | | |
|---|---|---|---|
| 4,401,630 | A | 8/1983 | Ettell et al. |
| 5,006,320 | A | 4/1991 | Reid et al. |
| 6,277,341 | B1 | 8/2001 | Pinches et al. |
| 8,252,086 | B2 * | 8/2012 | Seed .......................... C22B 3/02 423/658.5 |
| 2008/0050294 | A1 | 2/2008 | Liu et al. |
| 2008/0308468 | A1 * | 12/2008 | Verster .................... B03D 1/02 209/166 |

FOREIGN PATENT DOCUMENTS

WO 2004/106561 A1 12/2004
WO 2007093667 A1 8/2007

OTHER PUBLICATIONS

Fischmann, Adam J. and Dixon, David G. "Upgrading of a Chalcopyrite Concentrate by Reaction with Copper(II) and Sulfite—Unexpected Formation of Chevreul's Salt, Cu2SO3 2H2O." Minerals Engineering 23 pp. 746-751. (Year: 2010).*
Sequeira, C. A. C. et al. "Chemical Metathesis of Chalcopyrite in Acidic Solutions." Hydrometallurgy 92 pp. 135-140. (Year: 2008).*
Elliot, Alexander Dean and Watling, Helen R. "Chalcopyrite Formation through the Metathesis of Pyrrhotite with Aqueous Copper." Geochimica et Cosmochimica Acta 75 pp. 2103-2118. (Year: 2011).*
Rongjun, Ma. New Technologies for Copper Hydrometallurgy. (Changsha). pp. 173-177. Human translation. (Year: 1985).*
R.P. Hackl, D.B. Dreisinger, E. Peters, J.A. King, Passivation of chalcopyrite during oxidation leaching in sulfate media, Hydrometallurgy 39, Jun. 8, 1995, 25-48, 39 (1995), ELSEVIER, Canada.
R.I. Holliday, W.R. Richmond, An electrochemical study of the oxidation of chalcopyrite in acidic solution, Journal of Electroanalytical Chemistry and Interfacial Electrochemistry, Aug. 10, 1990, 83-98, vol. 288, Issue 1, ELSEVIER, Australia.
International Search Report and Written Opinion (dated Jan. 13, 2016).
MA Rongjun, New Technology of Hydrometallurgy of Copper, Aug. 31, 1985, 173-176—Hunan Science and Technology Press.

* cited by examiner

SYSTEM AND METHOD FOR ENHANCED METAL RECOVERY DURING ATMOSPHERIC LEACHING OF METAL SULFIDES

CROSS-REFERENCE TO RELATED APPLICATIONS

This application is a U.S. National stage § 371 application of PCT/US2015/050045, filed on 14 Sep. 2015, which claims priority to and the benefit of U.S. Provisional Patent Application No. 62/050,039, filed on Sep. 12, 2014 and titled "SYSTEM AND METHOD FOR ENHANCED METAL RECOVERY DURING ATMOSPHERIC LEACHING OF METAL SULFIDES." The contents of the aforementioned applications are hereby incorporated by reference in their entirety for any and all purposes as if fully set forth herein.

FIELD OF THE INVENTION

Embodiments of the invention relate to equipment, flowsheets, and processes for improving metal value extraction from metal sulfide ores. In particular, systems and methods for increasing metal recovery within an atmospheric, or substantially atmospheric, oxidative leach is disclosed. Also disclosed, are systems and methods for increasing metal recovery during heap leaching of metal sulfides.

BACKGROUND OF THE INVENTION

Current and past methods of atmospheric leaching of primary metal sulfides (e.g., Chalcopyrite, Tennantite, and Enargite), may suffer from slow reaction kinetics and poor metal recoveries due to surface passivation effects during oxidative leaching. Surface passivation occurs when the growth of an elemental sulfur product layer occludes the surfaces of the particles being leached. The sulfur reaction product layer acts as a physical barrier, impeding the transport of reactants and products from the reaction plane.

A number of factors may enhance the detrimental effects of the sulfur product, with regard to metal dissolution, by altering the porosity and/or tortuosity of the product layer. These factors, individually or collectively, include crystal phase transformations, partial melting and recrystallization, or complete crystal melting. The range of passivation effects will depend upon the temperature of the reaction medium and the temperature at the reaction zone which may be different from the overall system temperature. This temperature difference may be sustained throughout the entire leach process or it may be transitory.

Other mechanisms of passivation can include the formation of non-stoichiometric, metal-deficient sulfide phases that are resistant toward further anodic dissolution reactions. Furthermore, if the dissolution of the metal sulfide is taking place via an electrochemical redox mechanism, the anodic dissolution step will be dependent upon the pH and redox potential at the reaction plane.

A number of factors, known to those skilled in the art, can make it difficult to maintain an optimum redox potential and thereby achieve complete metal recovery at maximum dissolution rates. In some instances, leaching of primary metal sulfides may also suffer from slow reaction kinetics and poor metal recoveries due to residual frothing agents used during froth flotation. The residual frothing agents may be present on particles being leached and interfere with superficial leaching chemistries.

A number of past methods have been attempted to increase metal leach rates by employing leach catalysts. One approach suggested addressing the passivation issue by increasing electron transport though an electrically-resistive, reaction-product layer by doping the layer with fine particulate carbon (see for example U.S. Pat. No. 4,343,773). Moreover, a more recently-proposed method (US-2012/0279357) for addressing passivation relies on the addition of an activated carbon catalyst to enhance the leach rate of arsenic-containing copper sulfides. Still other approaches have used silver-based catalytic leach systems for enhancing the copper dissolution rates in acidic ferric sulfate media (J. D. Miller, P. J. McDonough and P. J. Portillo, Electrochemistry in Silver Catalyzed Ferric Sulfate Leaching of Chalcopyrite, in Process and Fundamental Considerations of Selected Hydrometallurgical Systems, M. C. Kuhn, Ed., SME-AIME, New York, pp. 327-338, 1981), while others have used silver-activated pyrite to accomplish similar results (U.S. Pat. No. 8,795,612). The Applicant has further recently proposed a method and process for the enhanced leaching of copper-bearing sulfide minerals which utilizes microwave irradiation during leaching to combat the adverse effects of passivation on leaching (WO2014074985 A1).

Still others have adopted pre-leach ultra-fine grinding (i.e., mechanical activation) of a copper sulfide concentrate to achieve rapid post-grinding leach kinetics. U.S. Pat. No. 5,993,635 describes a method for recovering copper from sulfide-mineral compositions which comprises the step of ultra-fine grinding of the leach feed to a P80 of about 5 µm (see Example 3 in U.S. Pat. No. 5,993,635). While copper dissolutions of 95% or greater were achieved in 10 hours on a small scale, grinding to such a small particle size prior to leaching is not always economically in those cases where the leach feed is a low-grade metal concentrate.

Still others have combined ultra-fine grinding and leaching in so-called batch Mechano-Chemical leaching processes which are circular batch processes which do not provide for continuous downstream flow. Moreover, all prior art methods have required excessively large energy inputs to achieve significant levels of copper dissolution from chalcopyrite. While leach times to achieve 80% copper extraction have been demonstrated to be as short as 1 hour, the approach is difficult to adapt for large-scale commercial operation (D. A. Rice, J. R. Cobble, and D. R. Brooks, Effects of Turbo-milling Parameters on the Simultaneous Grinding and Ferric Sulfate Leaching of Chalcopyrite, RI 9351, US Bureau of Mines, 1991). Furthermore, copper recoveries in excess of 95-97% were not achievable due to passivation at high elemental sulfur loading.

As previously stated, the application and consumption of large specific energy renders the economic feasibility of full-scale industrial metal recovery in mechano-chemical processes impractical.

OBJECTS OF THE INVENTION

It is, therefore, an object of some embodiments, to improve leach kinetics and metal recovery through the employment of a reductive activation step prior to oxidative leaching. The oxidative leach is preferably performed in an atmospheric or substantially atmospheric metal sulfide leach circuit.

It is also an object of some embodiments, to reduce and/or eliminate the need for the addition of a superfluous reagent or reagents into the leach circuit, which might cost additional money to purchase, ship, and dose; and/or which might negatively impact downstream SX/EW systems.

It is a further object of some embodiments, to provide a reductive activation prior to an oxidative leach process. The reductive activation induces lattice strain and alters the electrochemical properties within the leach particles by conversion to one or more transitory, metastable, non-stoichiometric binary metal sulfide phases.

According to yet further objects of some embodiments, the efficiency of heap leach operations may be improved by reductively treating an ore prior to heap leaching or after ore stacking but prior to oxidative leaching.

According to yet further objects of some embodiments, the efficiency of bio-leaching operations may be improved by reductively treating an ore prior to bio-leaching to produce lattice transformations and/or lattice strain via production of a metastable non-stoichiometric binary metal sulfide phase.

According to yet further objects of some embodiments, the efficiency of tank or vat leaching operations may be improved by reductively activating an ore prior to tank or vat leaching.

Yet another object of some embodiments, is to mitigate the effects of mechanical and/or electrochemical passivation by employing activation techniques prior to oxidative leaching (e.g., via reductive activation).

It is another object of some embodiments to mitigate the effects of mechanical and/or electrochemical passivation by employing mechano-chemical/physico-chemical activation techniques during oxidative leaching.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A method of improving metal leach kinetics and metal recovery during atmospheric or substantially atmospheric leaching of a metal sulfide is disclosed. The method may, in some embodiments, comprise the steps of: (a) producing a flotation concentrate; (b) processing the concentrate under reductive conditions to produce an activated concentrate; and, (c) subsequently processing the activated concentrate by oxidative dissolution to extract metal values.

In some embodiments, the reductively-activated concentrate may comprise particles composed of chalcopyrite, and impurities therein may comprise pyrite and silicates. In some embodiments, the activated concentrate may further comprise molybdenite and/or precious metals.

The method may further comprise the step of subjecting the activated concentrate to an oxidative leach process as described in step (c). In some embodiments, the activated concentrate may comprise chalcopyrite particles having an outer covellite-like mineral phase.

In some embodiments, the time to achieve greater than 95% extraction of metal values from the activated concentrate via oxidative dissolution may be less than 6 hours. In some embodiments, the time to achieve greater than 95% metal extraction by oxidative dissolution may be less than 5 hours, or between 2.5 and 4 hours.

In some embodiments, the reductive activation circuit may comprise one or more of the following: stirred tank reactors, shear tank reactors, and various combinations thereof.

In some embodiments, the reductive activation circuit may be maintained at a redox potential between 200 mV (SHE) and 650 mV (SHE), for example, between 200 mV (SHE) and 450 mV (SHE). In some embodiments, the oxidative leach circuit may be maintained at a redox potential between 600 mV (SHE) and 800 mV (SHE), for example, between 650 mV (SHE) and 750 mV (SHE).

In some embodiments, the step of oxidatively leaching the activated concentrate may further comprise the combination of a plurality of stirred-tank reactors with one or more shear-tank reactors. In some embodiments, the oxidative leach reactors may be arranged in series with the shear-tank reactor(s). In some embodiments, the oxidative, stirred-tank reactors may be arranged in parallel with the shear-tank reactors. In some embodiments, the oxidative, stirred-tank reactors may be arranged in series and in parallel with the shear-tank reactor(s).

In some embodiments, a single shear-tank reactor may be shared between multiple, oxidative stirred-tank reactors. In some embodiments, the method may further comprise converting/transforming a substantial portion of the metal sulfide particles within the metal sulfide concentrate to an activated mineral phase using at least one reductive activation reactor.

A metal recovery flowsheet is also disclosed. The metal recovery flowsheet may comprise: (a) a sulfide concentrator comprising a flotation circuit to produce a metal sulfide concentrate; and (b) an atmospheric, or substantially atmospheric, metal sulfide leach circuit. The atmospheric, or substantially atmospheric, metal sulfide leach circuit may comprise: (i.) a reductive activation process, (ii.) and a subsequent oxidative leach process for recovering at least one metal value from the activated concentrate via dissolution.

In some embodiments, the reductive activation circuit may be maintained at a redox potential between 200 mV (SHE) and 650 mV (SHE) with pH control, and the combination of pH and redox maintained in such a manner to produce the reductively-activated metal sulfide product.

In some embodiments, the oxidative leach circuit may be maintained at a pH below about 1.0 and a redox potential between 600 mV (SHE) and 800 mV (SHE), or at a combined pH of less than about 1.0 and a higher redox potential than the redox potential of the reductive activation circuit. In some embodiments, the flowsheet may further comprise one or shear-tank reactors operatively connected to a plurality of oxidative, stirred-tank reactors.

A method of extracting a metal from a metal sulfide particle is further disclosed. According to some preferred embodiments, the method may comprise the steps of: (reductively) activating a metal sulfide particle by a copper metathesis reaction thereby changing a portion of the metal sulfide particle from a primary metal sulfide to a non-stoichiometric, metastable binary-metal sulfide phase; and extracting a metal from the activated, metal sulfide particle. The conversion to a metastable non-stoichiometric binary metal sulfide phase is carried out so as to introduce point defects substantially throughout the entirety of the activated particle.

According to some preferred embodiments, the step of extracting the metal from the activated, metal sulfide particle may comprise an oxidative leaching process. According to some embodiments, the portion of the metal sulfide particle changed to the transitionary, non-stoichiometric, metastable binary-metal sulfide phase via a copper metathesis may be less than about one-half of the metal sulfide particle by weight or less than about one-half by volume. In yet other embodiments, the portion of the metal sulfide particle that is changed may amount to less than about one fourth of the metal sulfide particle by weight or less than about one fourth by volume. In still further embodiments, the portion of the metal sulfide particle that is changed may be less than about one tenth of the metal sulfide particle by weight or less than about one tenth by volume, for example around 2-8% of the particle by weight or volume, without limitation.

According to some embodiments, the step of activating the metal sulfide particle may be performed in a reductive environment ranging from about 200 to about 650 mV (SHE) with simultaneous pH control. According to some embodiments, the step of extracting the metal after reductive pre-treatment/activation of the metal sulfide particle may be performed by a heap leaching process, a vat leaching process, a tank leaching process, a dump leaching process, a bio-leaching process, or a combination thereof, without limitation; wherein the transitionary non-stoichiometric, metastable binary metal sulfide phase may improve leach kinetics and/or recovery of the metal.

In some embodiments, the method may further comprise the steps of: prior to the activation, analyzing a metal sulfide concentrate in order to determine whether passivating secondary metal sulfide rimming is present in an amount sufficient to inhibit activation of the metal sulfide particles; and subsequently decreasing a mean particle size of the concentrate to a sufficient degree if it is determined that the amount of passivating secondary metal sulfide rimming is sufficient to inhibit activation of the metal sulfide particles. In this regard, the activation step may be optimized and liberation of the metal from the metal sulfide particles may be improved. According to some embodiments, the step of analyzing the metal sulfide concentrate may be performed using a mineral analyzer. According to some embodiments, the method may further comprise the step of performing particle mapping or liberation analysis using data collected by the mineral analyzer. According to some embodiments, the step of decreasing the mean particle size may comprise grinding until the amount of passivating secondary metal sulfide rimming is less than about 25%. According to some embodiments, the step of decreasing the mean particle size may comprise grinding until the amount of passivating secondary metal sulfide rimming is less than about 10%. According to some embodiments, the step of decreasing the mean particle size may comprise grinding until the amount of passivating secondary metal sulfide rimming is less than about 5%. According to some embodiments, more than about 5% of a surface of the primary metal sulfide may contain the passivating secondary metal sulfide rimming. According to some embodiments, more than about 10% of a surface of the primary metal sulfide may contain the passivating secondary metal sulfide rimming. According to some embodiments, more than about 25% of a surface of the primary metal sulfide may contain the passivating secondary metal sulfide rimming. According to some embodiments, the primary metal sulfide phase may comprise chalcopyrite.

A method of leaching a metal sulfide concentrate is further disclosed. The method preferably comprises the steps of: processing a metal sulfide concentrate at a first redox potential to produce a reductively-activated metal sulfide concentrate comprising a non-stoichiometric metastable (e.g., transitionary) binary metal sulfide phase; and leaching a metal from the reductively-processed metal sulfide concentrate via oxidative dissolution.

According to some embodiments, the non-stoichiometric metastable binary-metal sulfide phase comprises less than about 50 wt. % or less than about 50 vol. % of the activated particle. According to some embodiments, the non-stoichiometric metastable binary metal sulfide phase comprises less than about 25 wt. % or less than about 25 vol. % of the activated particle. According to some embodiments, the non-stoichiometric metastable binary metal sulfide phase comprises less than about 10 wt. % or less than about 10 vol. % of the activated particle.

According to some embodiments, the oxidative dissolution occurs in an oxidative stirred-tank reactor at a second redox potential greater than a rest potential of the activated particle. According to some embodiments, the first redox potential ranges from about 200 to about 650 mV (SHE). According to some embodiments, the second redox potential ranges from about 600 to about 800 mV (SHE).

According to some embodiments, the metal sulfide concentrate comprises chalcopyrite. According to some embodiments, the oxidative dissolution is carried out in a shear-tank reactor; wherein reactor may be selected from at least one of the group consisting of: a stirred media reactor (i.e., SMRt reactor), a high-shear stirred reactor comprising one or more high-shear impellers and/or pumping blades, and a high-shear reactor comprising a high shear rotor and stator.

According to some embodiments, the method may further comprise leaching greater than 80% metal in under about 6 hours by operating the shear-tank reactor at a power density ranging from about 2 kilowatts per cubic meter to about 100 kilowatts per cubic meter. According to some embodiments, the method may comprise leaching greater than 95% metal in under about 6 hours by operating the shear-tank reactor at a power density ranging from about 5 kilowatts per cubic meter to about 100 kilowatts per cubic meter.

According to some embodiments, the method may comprise leaching greater than 98% metal in under about 6 hours by operating the shear-tank reactor at a power density ranging from about 5 kilowatts per cubic meter to about 20 kilowatts per cubic meter. According to some embodiments, the method may comprise leaching greater than 95% metal in under about 6 hours by operating the shear-tank reactor at a power density ranging from about 20 kilowatts per cubic meter to about 100 kilowatts per cubic meter. In some preferable embodiments, the metal leached from the metal sulfide is copper.

A method of extracting a metal from a metal sulfide particle is further disclosed. The method may comprise the steps of: activating a metal sulfide particle by changing a portion of the metal sulfide particle from a primary metal sulfide to an activated binary metal sulfide phase; followed by extracting a metal from the activated metal sulfide by an oxidative leach process.

According to some preferred embodiments, the oxidative leaching of the activated metal sulfide particles may be further enhanced by a physico-chemical process. The process may comprise an oxidative leach of a metal sulfide particle that substantially reduces both the electrochemical passivation and mechanical passivation of a metal sulfide particle via a physico-chemical mechanism. According to some embodiments, the physico-chemical mechanism may comprise the use of a shearing process and a stirred-tank leaching process. According to some embodiments, the shearing process may comprise mechanical scrubbing, grinding, attrition, or a combination thereof. According to some embodiments, the shearing process may use shear-tank reactor, which is selected from at least one of the group consisting of: a stirred media reactor (SMRt reactor), a high-shear, stirred reactor comprising one or more high shear impellers and/or pumping blades, and a high-shear reactor comprising a high-shear rotor and stator. According to some embodiments, said shearing process may be performed after the stirred-tank leaching process. According to some embodiments, said shearing process is performed before the stirred-tank leaching process. According to some embodiments, said shearing process may be performed in series and/or in parallel with the stirred-tank leaching process. According to some embodiments, said stirred-tank leaching process and said shear tank reactor(s) may be performed via a flow-through continuous linear process.

According to some embodiments, the stirred-tank reactors may be operated under atmospheric pressure and the shear-tank reactors may be substantially operated above atmospheric pressure or at atmospheric pressure.

According to some embodiments, the shear-tank reactors may be operated at an oxygen overpressure pressure ranging from about 1 to about 10 bar. According to some embodiments, the metal sulfide particles may spend greater than about 80-95% of their collective residence time within the stirred-tank reactors. According to some embodiments, the metal sulfide particles may spend less than about 10-20% of their collective residence time within the shear tank reactors. According to some embodiments, the shearing process may comprise controlling both the pH and redox potential simultaneously by using acid, ferric iron, gaseous $O_2$, air, or a combination thereof.

According to some embodiments a wetting agent may be used to control frothing. The wetting agent may comprise one or more of a polymeric electrolyte, a polymeric flocculant, or a variety of polymeric electrolytes and polymeric flocculants.

According to some embodiments, a wetting agent may be advantageously used to reduce the amount of residual metal in the leach tailings from the oxidative leach process to less than 1 wt. %, more advantageously to less than 0.8 wt. % and more advantageously to less than 0.5 wt. %.

According to some embodiments, one or more shear-tank reactors may be operatively coupled to a plurality of stirred-tank reactors, wherein a collective residence time of the metal sulfide particles in the one or more shear-tank reactors may depend upon overall residence time within the oxidative leach process. The residence time within the one or more shear-tank reactors will also depend upon the volumetric ratio between the combined volume of the stirred-tank reactor(s) and the combined volume of the shear reactors. The preferred volumetric ratio is not equal to one. According to some embodiments, the volumetric ratio of the shear-tank reactor(s) to the stirred-tank reactor(s) may be between about 1:10 and about 1:150.

According to some embodiments, about 90% or greater metal recovery may be achieved in less than 10 hours while operating at a temperature below the melting point of elemental sulfur. According to some embodiments, the process may further comprise ultra-fine grinding of the concentrate prior to reductive activation and oxidative leaching to a P95 of 40 microns or finer.

BRIEF DESCRIPTION OF THE DRAWINGS

To complement the description which is being made, and for the purpose of aiding to better understand the features of the invention, a set of drawings illustrating preferred processing apparatus and methods of using the same is attached to the present specification as an integral part thereof, in which the following are depicted as illustrative and non-limiting character. It should be understood that like reference numbers used in the drawings (if any are used) may identify like components.

In the following, the invention will be described in more detail with reference to drawings in conjunction with exemplary non-limiting embodiments.

DETAILED DESCRIPTION OF THE INVENTION

The following description of the non-limiting embodiments shown in the drawings is merely exemplary in nature and is in no way intended to limit the inventions disclosed herein, their applications, or uses.

Figure 1:
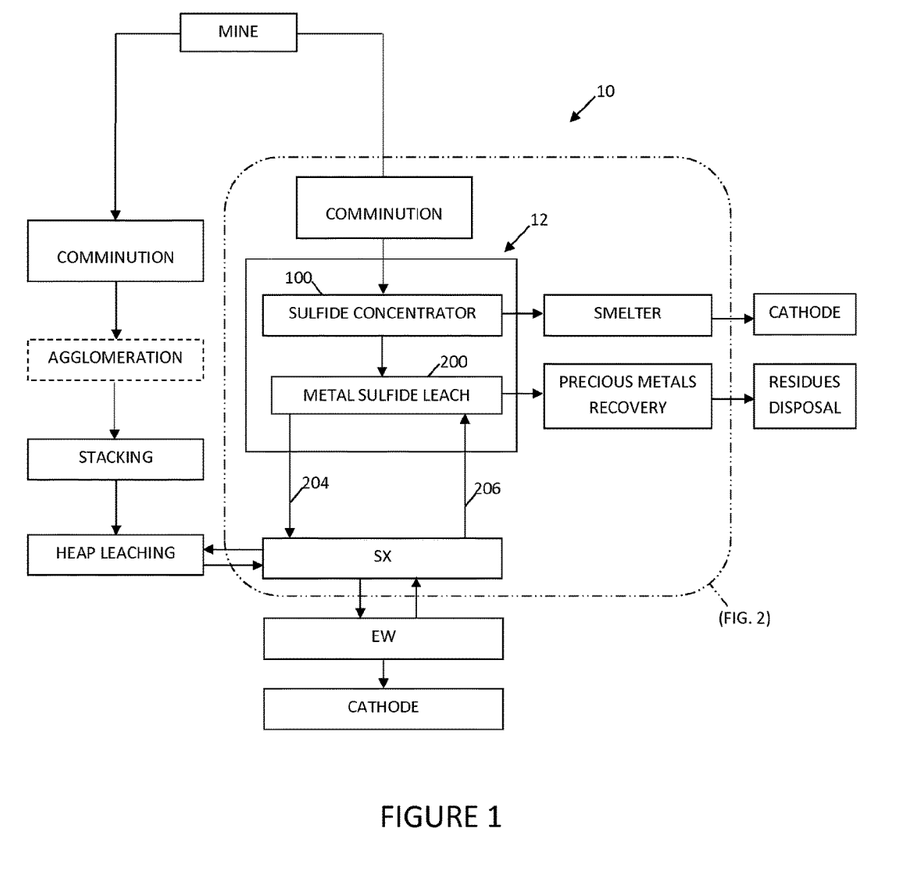
FIG. 1 is a schematic diagram illustrating a non-limiting, exemplary flowsheet which might employ certain embodiments of the invention.

As schematically shown in FIG. 1, embodiments of the invention may comprise a metal recovery flowsheet 10 having a unit operation 12. The unit operation 12 may comprise an atmospheric or substantially atmospheric metal sulfide leach circuit 200 downstream of a sulfide concentrator circuit 100, without limitation. Peripheral flowsheet operations, typical to such processes known to those skilled in the art of minerals processing, are not shown.

In some preferred embodiments, most or all of the oxidative leaching may occur at atmospheric pressure conditions. In some embodiments, a small amount of oxidative leaching (e.g., leaching occurring within one or more optional, but preferred shear-tank reactors) may occur at atmospheric conditions or optionally above atmospheric conditions.

Figure 2:
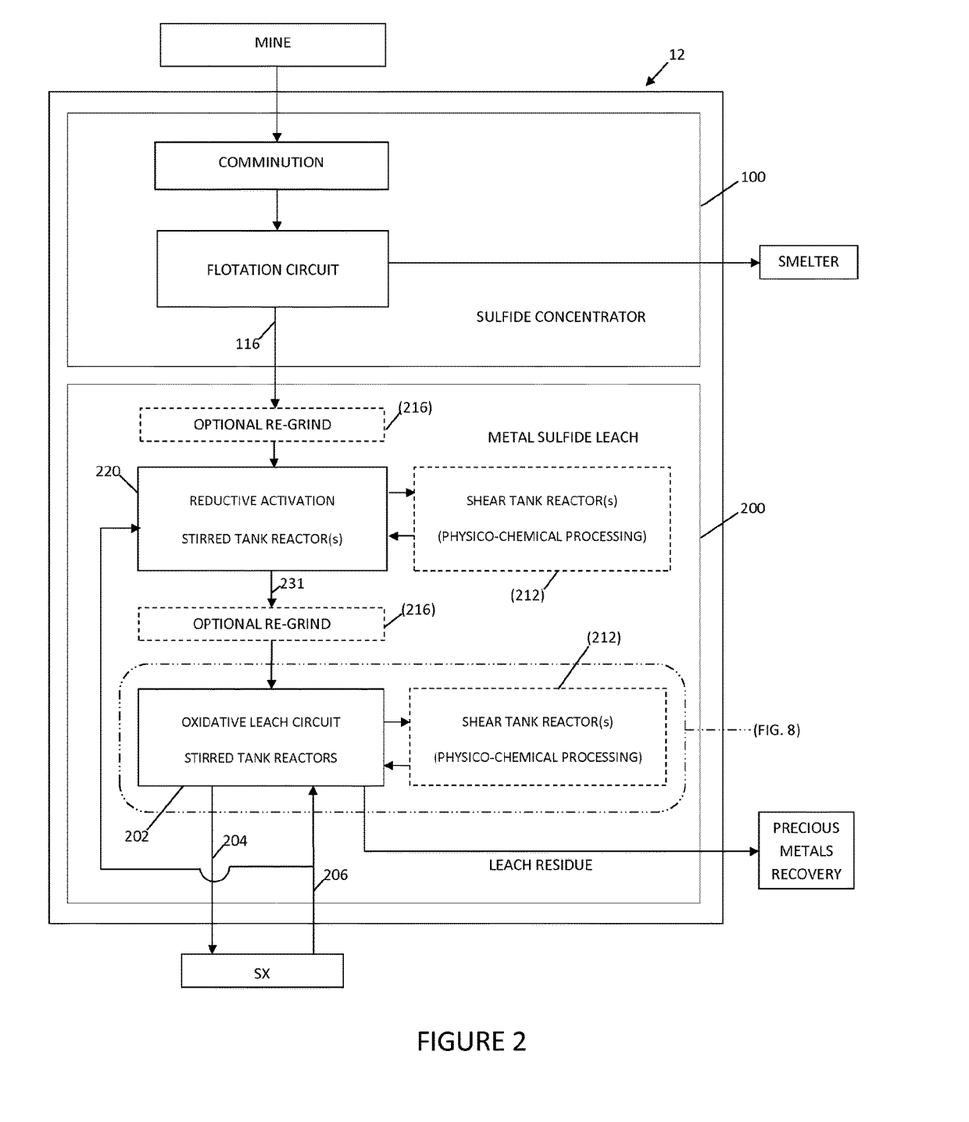
FIG. 2 is a schematic diagram illustrating, in more detail, a portion of the non-limiting, exemplary flowsheet shown in FIG. 1, wherein a reductive activation/pretreatment step may be performed prior to an oxidative atmospheric (or substantially atmospheric) metal sulfide leach process.

In some preferred embodiments, a majority of the cumulative leaching time may occur at atmospheric pressure conditions, and a minimal amount of cumulative leaching time may occur above atmospheric conditions. For example, in some non-limiting embodiments, an oxidative leach reactor 202, such as the one shown in FIGS. 2, 3, and 8, may comprise one or more continuous stirred-tank reactors (CSTRs). The shear-tank reactors may comprise one or more enclosed stirred media reactors which are preferably configured to be pressurized (e.g., to 1-20 bar, 1-10 bar, 1-5 bar, approximately 5 bar, or the like), receive oxygen, an oxygen containing gas, and/or contain grinding media, without limitation.

In some embodiments, a shear-tank reactor 212 may comprise one or more enclosed high shear stirred reactors configured to be pressurized (e.g., to 1-20 bar, 1-10 bar, 1-5 bar, approximately 5 bar, or the like), receive oxygen, and/or impart shear by using one or more high shear impellers and/or pumping blades, without limitation. In some embodiments, the high shear impellers may be selected from the group consisting of: a Cowles disperser blade, a sawblade mixing impeller, a dispersion blade, a saw tooth dispersion blade, an angled tooth blade, an ultra-shear dispersion blade, a high-flow dispersion blade, a rotor/stator, and a combination thereof, without limitation.

Figure 8:
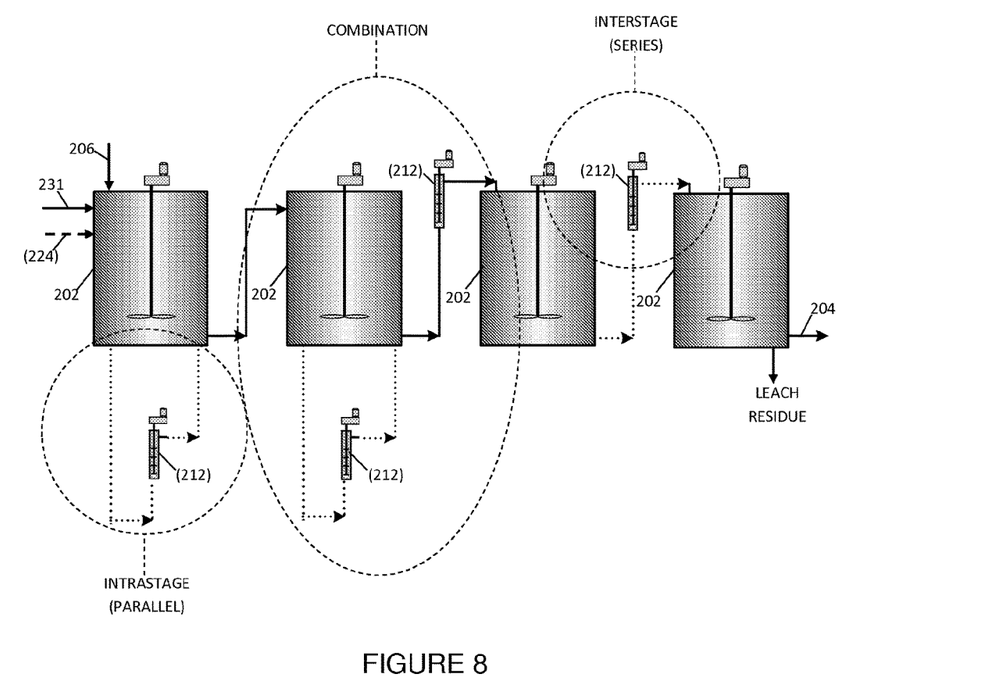
FIG. 8 suggests several exemplary and non-limiting arrangements of shear-tank reactors and a plurality of stirred-tank reactors within an oxidative metal sulfide leach circuit. It should be understood that the particular arrangement depicted in FIG. 8 has been provided merely to illustrate several different possible cooperative structural relationships between shear-tank reactors and stirred-tank reactors within the same figure, and therefore, variant embodiments should not be limited to the particular configuration shown. Accordingly, anticipated embodiments may practice as little as one of the particular configurations shown; anticipated embodiments may practice more than one of the particular configurations shown; anticipated embodiments may contain any pattern or sequence of the particular configurations shown; and anticipated embodiments may contain one or more of the particular configurations redundantly, without limitation.

In some embodiments, the plurality of oxidative leach reactors 202 may be operatively coupled to a shear-tank reactor 212 in parallel, in series, or a combination thereof (as suggested in FIG. 8). In some preferred embodiments, a shear-tank reactor 212 is placed in series, i.e., interposed between two oxidative, stirred tank reactors 202.

In some preferred embodiments, the volume of a shear-tank reactor 212 may be relatively less than the volume of an oxidative stirred tank reactor 202. In some preferred embodiments, the energy consumed by a shear-tank reactor 212 may be relatively more than the energy consumed by an oxidative stirred tank reactor 202.

In some embodiments (not shown), the one or more shear-tank reactors 212 may be omitted from the atmospheric or substantially atmospheric metal sulfide leach circuit 200 altogether. This arrangement can be advantageously used in those cases where a high-grade concentrate is first ground to an ultra-fine size distribution prior to reductive activation and downstream oxidative leaching.

If one or more separate shear-tank reactors 212 are utilized in combination with a plurality of oxidative stirred-tank reactors 202, then slurry recycle may be employed within the oxidative leach process.

Dissolved copper is provided to enable the reductive activation process to proceed. The amount of dissolved copper provided should be sufficient to complete the desired degree of conversion from the primary metal sulfide to the metastable, non-stoichiometric binary metal sulfide. The residence time required to complete the activation processing is typically between approximately 5 and 60 minutes. For example, a residence time of approximately 10-45 minutes, or a residence time of approximately 15-30 minutes, such as 20 minutes, may be sufficient prior to moving on to a downstream oxidative leach step. The activated metal sulfide concentrate 116 may be optionally re-ground in step 216, or sent directly to an oxidative leach circuit 202.

Pregnant leach solution (PLS) 204 created during the atmospheric or substantially atmospheric leaching of the metal sulfide concentrate 116 may be sent from the oxidative leach circuit 200 to a downstream solvent extraction/electrowinning (SX/EW) circuit, or direct electrowinning (D/EW) process.

Raffinate 206 may be recycled from the respective downstream solvent extraction/electrowinning (SX/EW) circuit, or direct electrowinning (D/EW) processes, and sent back to the oxidative leach circuit 200. Leach residues formed within the atmospheric or substantially atmospheric metal sulfide leach circuit 200 may be sent to a precious metals recovery circuit and/or ultimately to a leach residues disposal area as suggested by FIG. 1. While not expressly shown, leach residue sulfur may be internally or externally processed/recovered/removed, in order to create sulfuric acid which can re-supply the leach processes within the metal recovery flowsheet 10, such as the activation circuit 220 and/or the oxidative 202 leach circuit. Manufactured sulfuric acid produced from the elemental sulfur may also be sent to another unit operation(s), or may be sold or distributed outside of the flowsheet 10, as a salable byproduct to help offset flowsheet 10 operating costs.

Figure 3:
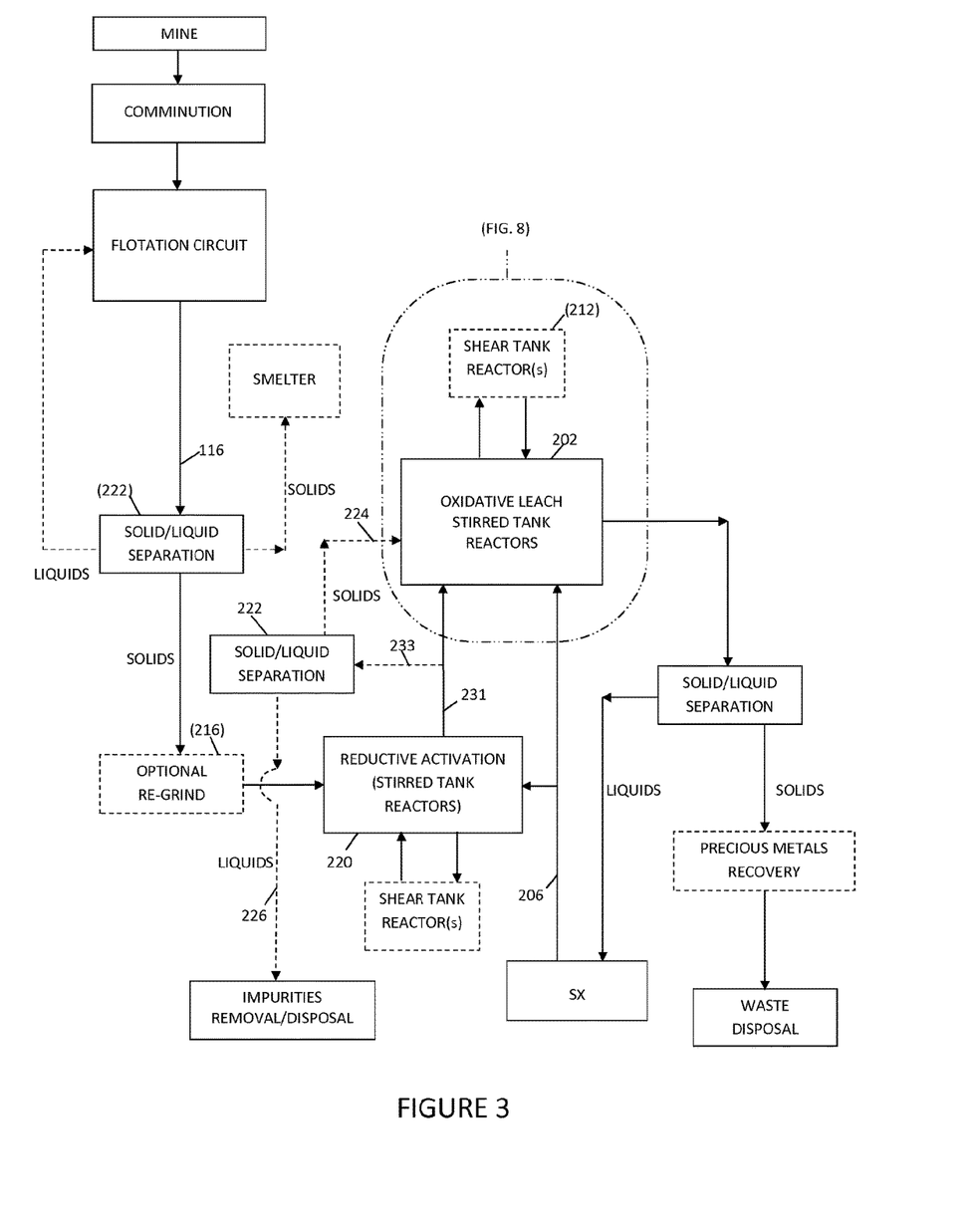
FIG. 3 is a schematic diagram illustrating a system and method of providing a reductive activation step prior to an oxidative atmospheric (or substantially atmospheric) metal sulfide leach, according to some embodiments.
Figure 4:
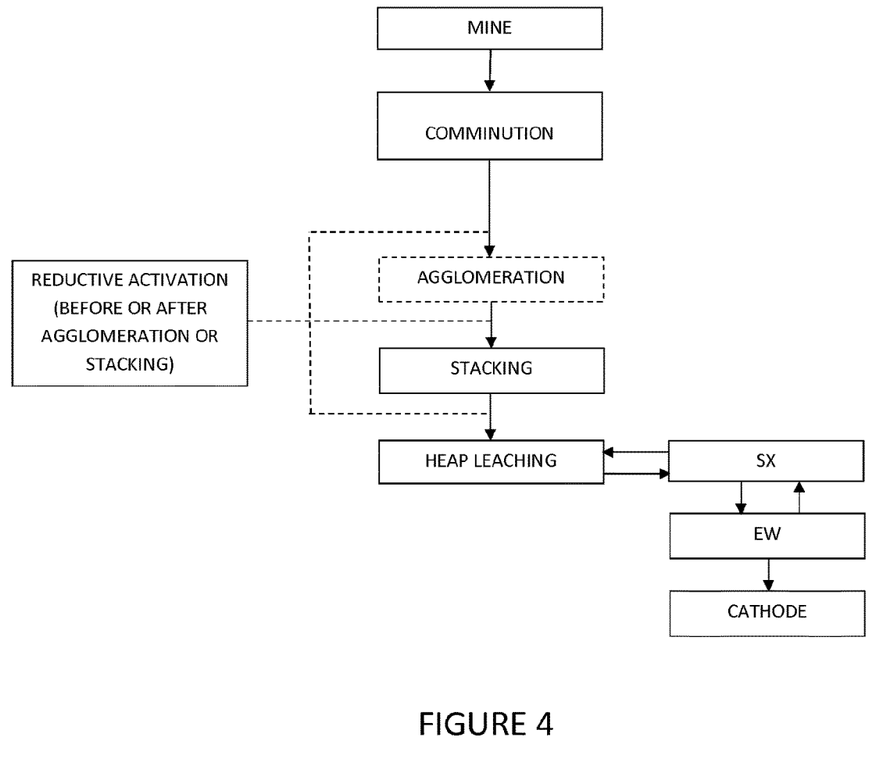
FIG. 4 is a schematic diagram illustrating a system and method of using a reductive activation and/or a reductive pre-treatment step which may be employed in heap leach operations.
Figure 5:
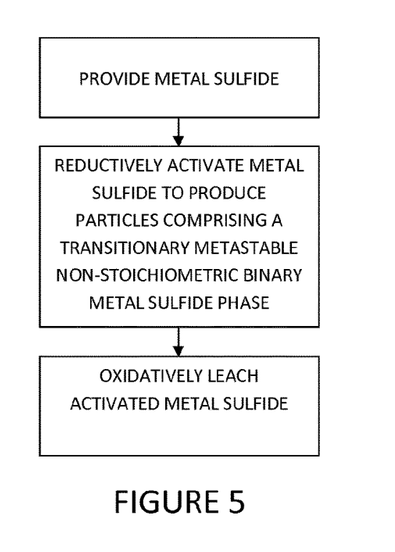
FIG. 5 suggests a method for enhancing metal recovery from metal sulfides and/or for enhancing leach kinetics of metal sulfides according to some embodiments which may be utilized for various forms of leaching including, but not limited to, vat leaching, tank leaching, heap leaching, bio-leaching, and/or the like, without limitation.
Figure 6:
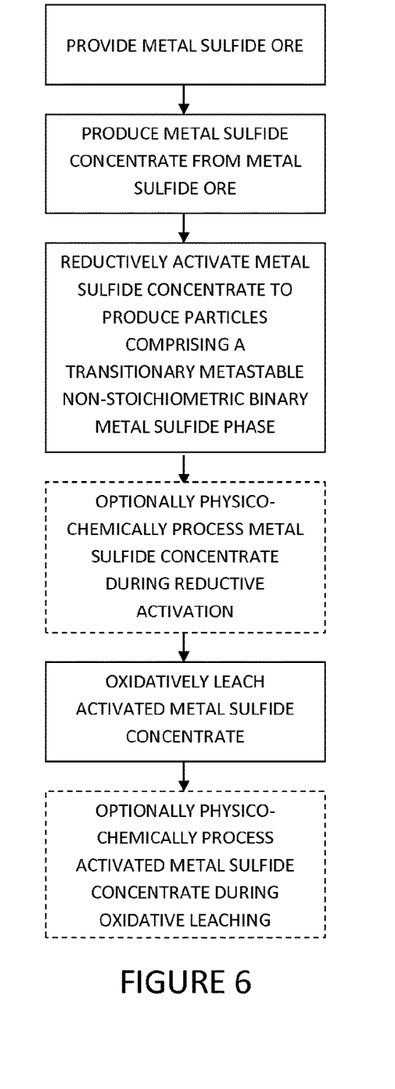
FIG. 6 suggests a method for enhancing metal recovery from metal sulfides and/or for enhancing leach kinetics of metal sulfides according to some embodiments; particularly for leaching metal sulfide concentrates.
Figure 7:
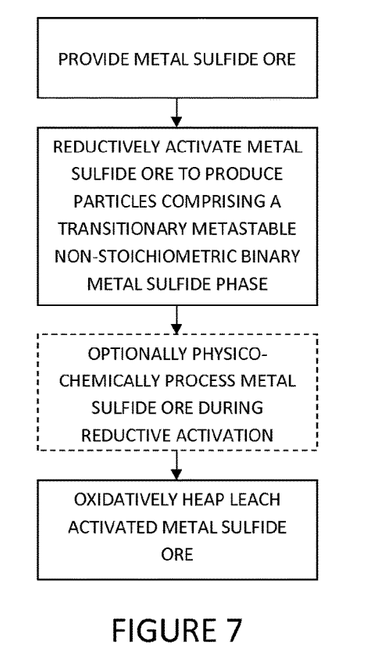
FIG. 7 suggests a method for enhancing metal recovery from metal sulfides and/or for enhancing leach kinetics of metal sulfides according to some embodiments; particularly for heap leaching metal sulfide ores.

In some embodiments, a bleed stream 233 may be separated from the main flow of reductive activated product 231 as shown in FIG. 3. The bleed stream 233 enters a solid/liquid separation circuit 222 which may comprise equipment such as a filter, thickener, centrifuge, cyclone, dewatering screen, or the like, without limitation. The solid fraction 224 leaving the solid/liquid separation circuit 222 may be recombined with the activated concentrate to be processed in the oxidative leach circuit 202. The liquid fraction 226 leaving the solid/liquid separation circuit 222 may enter one or more downstream processes for recovering other metals, or impurities removal, without limitation.

"Reductive activation", where described herein, may comprise any metathesis or pre-treatment step, process, system, or device which is capable of converting at least a portion of a leach particle from a first mineral phase to a transitionary mineral phase. For example, a "reductive activation" pretreatment step or circuit may be configured to change or convert an outer surface of a leach particle from a primary metal sulfide (e.g., chalcopyrite) to a metastable non-stoichiometric binary metal sulfide phase which differs from chalcopyrite and covellite. In some embodiments, a reductive activation step, may completely or partially modify, disturb, damage, or alter the crystal lattice sufficiently to enhance the oxidative dissolution process whereby the leach time to reach approximately 95% metal recovery can be achieved in about 6 hours or less.

In some instances, chalcopyrite leach particles may undergo a reductive activation/reductive pre-treatment step in the one or more reductive leach reactors 220, wherein at least a portion of the outer surface product layers of the chalcopyrite leach particles may be at least partially transformed to a transitionary mineral phase comprising a metastable non-stoichiometric binary metal sulfide phase, wherein the chalcopyrite leach particles are not fully converted to a secondary metal sulfide phase such as covellite. For example, less than about half of each particle may be converted to said transitionary mineral phase, and more preferably, less than about 10% of each particle, but more than 50% of each particle outer surface may be converted to said transitionary mineral phase, and therefore, residence time of the metal sulfide concentrate 116 within the reductive activation process may be kept to a minimum.

In some instances, the activation may require conversion of 0.01 to 50% of the primary sulfide; or alternatively may require conversion of 0.01 to 40% of the primary metal sulfide; or alternatively may require conversion of 0.01 to 30% of the primary sulfide; or alternatively may require conversion of 0.01 to 20% of the primary sulfide; or alternatively may require conversion of 0.01 to 10% of the primary sulfide; for example conversion of as little as 2 to 8% of the primary sulfide. The extent of conversion to a metastable non-stoichiometric binary metal sulfide phase is carried out so as to introduce point defects substantially throughout the entirety of the activated particle.

Redox potential may, in some instances, vary within the reductive activation process as a function of time or within various reductive leach reactors 220. In some instances, the reductive process may comprise a different pH than a pH maintained during the subsequent oxidative leach. In some instances, the reductive activation may comprise a different redox potential than the subsequent oxidative leach. For example, the measured redox potential within the activation circuit 220 may fall within the range of approximately 200 mV (SHE) to about 650 mV (SHE), wherein portions of the chalcopyrite leach particles may be converted to a transitionary, mineral phase comprising a metastable, non-stoichiometric binary metal sulfide phase. Measured redox potential within the oxidative leach circuit, may fall within the range of approximately 600 mV (SHE) to about 800 mV (SHE). These redox potentials may change or fluctuate with time or depending on the composition of concentrate and/or the metal value desired to be recovered from the concentrate.

In some embodiments, the metal sulfide concentrate 116 (e.g., copper sulfide concentrate) may comprise residual flotation reagents. In some preferred embodiments, the metal sulfide comprises copper in the form of Chalcopyrite ($CuFeS_2$), and/or Covellite (CuS). However, it should be known that other metal-bearing minerals occurring in combination with metal sulfides (e.g., including Acanthite $Ag_2S$, Chalcocite $Cu_2S$, Bornite $Cu_5FeS_4$, Enargite $Cu_3AsS_4$, Tennantite $Cu_{12}As_4S_{13}$, Tetrahedrite $Cu_3SbS_3.x(Fe, Zn)_6Sb_2S_9$, Galena PbS, Sphalerite ZnS, Chalcopyrite $CuFeS_2$, Pyrrhotite $Fe_{1-x}S$, Millerite NiS, Pentlandite $(Fe,Ni)_9S_8$, Cinnabar HgS, Realgar AsS, Orpiment $As_2S_3$, Stibnite $Sb_2S_3$, Pyrite $FeS_2$, Marcasite $FeS_2$, Molybdenite $MoS_2$, Malachite $CuCO_3.Cu(OH)_2$, Azurite $2CuCO_3.Cu(OH)_2$, Cuprite $Cu_2O$, Chrysocolla $CuO.SiO_2.2H_2O$) may be used with the disclosed systems and methods.

In some embodiments, portions of the atmospheric or substantially atmospheric metal sulfide leach circuit 200, such as the plurality of oxidative leach reactors 202, may be maintained below a pH of about 1.8 (e.g., between a pH of 0.5 and a pH of about 1.2).

In some preferred embodiments, the atmospheric or substantially atmospheric metal sulfide leach 200 may be maintained at a temperature which is below the melting point of elemental sulfur, to control passivation of the leaching particles.

It should be known that the particular features, processes, and benefits which are shown and described herein in detail are purely exemplary in nature and should not limit the scope of the invention. For example, where used herein, and in related co-pending applications referenced herein, the term "atmospheric leach" may comprise leaching under very small amounts of pressure which are close, but not exactly, ambient. In other words, while it is most preferred that "atmospheric" leaching is performed completely open to air, it is anticipated by the inventors that some best modes of leaching using the inventive concepts may incorporate the use of a plurality of stirred-tank reactors 202 which are open to air, and one or more smaller shear-tank reactors 212 which may be pressurizable (e.g., to 1-10 bar) to overcome oxygen transfer limitations. Accordingly, portions of the oxidative metal sulfide leach 200 may be performed under slight pressure (e.g., in a covered or pressurizable vessel) or completely atmospherically (e.g., in a plurality of non-pressurized stirred-tank reactors).

It is further anticipated that in preferred embodiments, most (e.g., up to approximately 95%) of the cumulative oxidative leach time of a metal sulfide leach particle may occur at atmospheric conditions, while less than approximately 10% of the cumulative oxidative leach time may occur at or above atmospheric conditions, giving rise to the term "substantially atmospheric" used throughout this description.

Without departing from the intent of the invention, reductive and/or oxidative reactor head space may be atmospheric or alternatively pressurized to above ambient pressure to enhance oxygen mass transfer. The pressure may be controlled by temperature and/or by an applied gas pressure that is above ambient pressure. It is anticipated that above-atmospheric pressures, where/if used, may approach as much as 20 bar, but are preferably kept between about 1 bar and about 10 bar, for example, approximately 5 bar, without limitation.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of improving metal leach kinetics and recovery during atmospheric or substantially atmospheric leaching of a metal sulfide, the method comprising:
   (a) producing a metal sulfide concentrate comprising chalcopyrite, via flotation;
   (b) processing the metal sulfide concentrate in one or more reductive activation reactors which are held at a first redox potential, to produce a reductively-activated metal sulfide concentrate via a copper metathesis reaction; and,
   (c) subsequently processing the reductively-activated metal sulfide concentrate in an oxidative leach process to extract and recover metal values;
   wherein the reductively-activated metal sulfide concentrate comprises activated particles comprising chalcopyrite and a transitory, metastable non-stoichiometric binary metal sulfide phase with point defects substantially throughout the entirety of the activated particles.

2. A method of improving metal leach kinetics and recovery during atmospheric or substantially atmospheric leaching of a metal sulfide, the method comprising:
   (a) producing a metal sulfide concentrate comprising chalcopyrite particles via flotation;
   (b) processing the metal sulfide concentrate in one or more reductive activation reactors which are held at a first redox potential, to produce a reductively-activated metal sulfide concentrate via a copper metathesis reaction; and, (c) subsequently processing the reductively-activated metal sulfide concentrate in an oxidative leach process to extract and recover metal values;

wherein the reductively-activated metal sulfide concentrate comprises converted chalcopyrite particles having a transitionary metastable non-stoichiometric binary metal sulfide mineral phase which differs from covellite.

3. A method of improving metal leach kinetics and recovery during atmospheric or substantially atmospheric leaching of a metal sulfide, the method comprising:

(a) producing a metal sulfide concentrate via flotation;

(b) processing the metal sulfide concentrate in one or more reductive activation reactors which are held at a first redox potential, to produce a reductively-activated metal sulfide concentrate via a copper metathesis reaction; and, (c) subsequently processing the reductively-activated metal sulfide concentrate in an oxidative leach process to extract and recover metal values;

wherein step (c) comprises moving the reductively-activated metal sulfide concentrate from a plurality of oxidative stirred-tank reactors to one or more shear-tank reactors.

4. The method of claim 3, wherein the plurality of oxidative stirred-tank reactors are in series with said one or more shear-tank reactors.

5. The method of claim 3, wherein the plurality of oxidative stirred-tank reactors are in parallel with said one or more shear-tank reactors.

6. A method of improving metal leach kinetics and recovery during atmospheric or substantially atmospheric leaching of a metal sulfide, the method comprising:

(a) producing a metal sulfide concentrate comprising chalcopyrite via flotation;

(b) processing the metal sulfide concentrate in one or more reductive activation reactors which are held at a first redox potential, to produce a reductively-activated metal sulfide concentrate via a copper metathesis reaction; and, (c) subsequently processing the reductively-activated metal sulfide concentrate in an oxidative leach process to extract and recover metal values;

wherein step (b) involves converting less than about 10 wt. % or less than about 10 vol. % of chalcopyrite within the metal sulfide concentrate, to a metastable non-stoichiometric binary metal sulfide mineral phase.

7. A method of extracting a metal from a metal sulfide particle, comprising:

activating a metal sulfide particle comprising chalcopyrite, by changing a portion of the metal sulfide particle from chalcopyrite to a non-stoichiometric, metastable binary metal sulfide phase to introduce point defects substantially throughout the entirety of the activated metal sulfide particle; and extracting copper from the activated metal sulfide particle.

8. The method of claim 7, wherein extracting copper from the activated metal sulfide particle comprises an oxidative leaching process.

9. The method of claim 7, wherein the portion of the metal sulfide particle changed to a non-stoichiometric, metastable binary metal sulfide phase is less than about one tenth of the metal sulfide particle by weight or less than about one tenth by volume.

10. The method of claim 7, wherein activating the metal sulfide particle is performed in a reductive environment ranging from about 200 to about 650 mV (Standard Hydrogen Electrode).

11. A method of leaching a metal sulfide concentrate, comprising:

processing a metal sulfide concentrate in a reactor at a first redox potential to produce a reductively-processed metal sulfide concentrate comprising an activated particle having a non-stoichiometric metastable binary metal sulfide phase with point defects introduced substantially throughout the entirety of the activated particle; and leaching a metal from the reductively-processed metal sulfide concentrate via oxidative dissolution;

wherein the oxidative dissolution occurs in an oxidative leach reactor at a second redox potential which is greater than a rest potential of the activated particle.

12. The method of claim 11, wherein the non-stoichiometric metastable binary metal sulfide phase comprises less than about 10 wt. % or less than about 10 vol. % of the activated particle.

13. The method of claim 11, wherein the first redox potential ranges from about 200 to about 650 mV (Standard Hydrogen Electrode).

14. The method of claim 11, wherein the second redox potential ranges from about 600 to about 750 mV (Standard Hydrogen Electrode).

15. The method of claim 11, wherein the metal sulfide concentrate comprises chalcopyrite.

16. The method of claim 11, wherein the metal leached from the metal sulfide concentrate is copper.

17. A method of extracting a metal from a metal sulfide particle, comprising:

activating a metal sulfide particle comprising chalcopyrite, by changing less than about 10 wt. % or less than about 10 vol. % of the metal sulfide particle from a primary metal sulfide to a binary metal sulfide phase; and extracting copper from the activated metal sulfide particle by an oxidative leach process.

18. The method of claim 17, wherein the binary metal sulfide phase comprises a non-stoichiometric metastable binary metal sulfide phase with point defects substantially throughout the entirety of the activated metal sulfide particle.

19. A method of leaching a metal sulfide concentrate, comprising:

processing a metal sulfide concentrate in a reactor at a first redox potential to produce a reductively-processed metal sulfide concentrate comprising an activated particle having a non-stoichiometric metastable binary metal sulfide phase with point defects introduced substantially throughout the entirety of the activated particle; and leaching a metal from the reductively-processed metal sulfide concentrate via oxidative dissolution;

wherein the second redox potential ranges from about 600 to about 750 mV (Standard Hydrogen Electrode).

* * * * *